United States Patent
Reimer

(10) Patent No.: US 12,299,109 B2
(45) Date of Patent: May 13, 2025

(54) USER AUTHENTICATION IN A PREMISES SECURITY SYSTEM

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 232 days.

(21) Appl. No.: 17/868,295

(22) Filed: Jul. 19, 2022

(65) Prior Publication Data

US 2024/0028690 A1    Jan. 25, 2024

(51) Int. Cl.
*G06F 21/43*    (2013.01)
*G08B 29/16*    (2006.01)
*H04W 12/06*    (2021.01)

(52) U.S. Cl.
CPC ............ *G06F 21/43* (2013.01); *G08B 29/16* (2013.01); *H04W 12/06* (2013.01); *G06F 2221/2103* (2013.01)

(58) Field of Classification Search
None
See application file for complete search history.

(56) References Cited

U.S. PATENT DOCUMENTS

| | | | |
|---|---|---|---|
| 9,426,432 B2 | 8/2016 | Scalisi | |
| 10,038,689 B1* | 7/2018 | Chan | H04L 63/107 |
| 10,062,224 B2 | 8/2018 | Cojocaru et al. | |
| 10,867,026 B1 | 12/2020 | Trundle et al. | |
| 11,019,086 B2 | 5/2021 | Epstein et al. | |
| 11,257,356 B2 | 2/2022 | Tannenbaum et al. | |
| 2012/0214442 A1* | 8/2012 | Crawford | G06F 21/316 455/411 |
| 2012/0216260 A1* | 8/2012 | Crawford | G06F 21/31 726/5 |
| 2017/0094050 A1* | 3/2017 | Przewloka | H04L 51/066 |
| 2017/0163471 A1* | 6/2017 | Zheng | G06Q 50/01 |
| 2017/0213447 A1 | 7/2017 | Horrocks et al. | |
| 2017/0289168 A1 | 10/2017 | Bar et al. | |
| 2018/0068504 A1 | 3/2018 | Mohan et al. | |
| 2018/0158312 A1* | 6/2018 | Tannenbaum | G07C 9/00 |
| 2018/0268674 A1 | 9/2018 | Siminoff | |
| 2019/0005751 A1 | 1/2019 | Warren | |
| 2019/0075096 A1* | 3/2019 | Chan | H04L 63/107 |
| 2020/0357206 A1 | 11/2020 | Tran et al. | |
| 2020/0382327 A1* | 12/2020 | Mokhasi | G06Q 20/4097 |

* cited by examiner

*Primary Examiner* — Kaveh Abrishamkar
(74) *Attorney, Agent, or Firm* — Weisberg I.P. Law, P.A.

(57) ABSTRACT

A device for verification of a user, the device being in communication with a security base station of a premises security system. The device comprises processing circuitry, which is configured to receive, from the security base station, security system data associated with user activity at a premises monitored by the premises security system; generate at least one verification question associated with the user activity; and based on a user response to the at least one verification question, one of grant and deny access to the user to a user account.

17 Claims, 4 Drawing Sheets

USER AUTHENTICATION IN A PREMISES SECURITY SYSTEM

FIELD

The invention relates in general to user account verification associated with a security base station, and in particular generating verification questions associated with user activity at a premises.

BACKGROUND

Some security alarm companies providing professional monitoring use verbal passwords, sometimes referred to as personal identification codes (PIC), in response to an intrusion alarm to confirm the identity of the person answering a call from an alarm monitoring agent. A PIC is distinct from a customer's PIN that is used to disarm/arm the premises security system. In one example scenario, when an alarm is triggered by a premises security system, the security monitoring receives an indication of the alarm and may call one or more user's associated with the premises security system to, for example, verify whether the alarm is a false alarm and dispatch first responders if necessary. This process is used to prevent an unauthorized person (e.g., burglar, etc.) from answering the call and cancelling the alarm of the premises security system, since the verbal password should not be known to anyone but the customer and/or the customer's designated representatives associated with the premises being monitored.

Unfortunately, users tend to forget their verbal password since it is used so infrequently. That is, compared to a user's PIN that is used to arm/disarm the premises security system possibly one or more times a day, the verbal password or PIC may be used, for example, once a year. This leads to an increased number of false alarms as a whole because the security monitoring company will not cancel an alarm without positively verifying the identity of the person answering their call. It is estimated that as few as only 30% of customers know their verbal password or PIC.

Hence, existing processes for verification of a user during a triggered alarm of a premises security system are not without issues.

SUMMARY

The techniques of this disclosure generally relate to the generation of verification questions associated with user activity monitored by a premises security.

The various embodiments described herein include a system and method for verifying user identity for a security system using questions related to events and activities in the home, specific to each customer/user such as to, for example, grant access to a user's account.

In one aspect, the present disclosure provides a device for verification of a user. The device is in communication with a security base station of a premises security system. The device includes processing circuitry. The processing circuitry receives, from the security base station, security system data associated with user activity at a premises monitored by the premises security system. The processing circuitry generates at least one verification question associated with the user activity; and based on a user response to the verification question, grants or denies access to the user to a user account.

According to some embodiments of this aspect, the processing circuitry is also configured to present the verification question after an occurrence of a trigger event. According to some embodiments of this aspect, generating the verification question occurs after the occurrence of the trigger event. According to some embodiments of this aspect, the trigger event comprises activation of a premises alarm.

According to some embodiments of this aspect, the processing circuitry is also configured to receive the data corresponding to the user-activity from a user device located at the premises. According to some embodiments of this aspect, the processing circuitry is also configured to determine a confidence value of the verification question, the confidence value being based at least on the user activity. According to some embodiments of this aspect, the processing circuitry is also configured to cause display of the verification question only if the corresponding confidence value is greater than a predetermined threshold.

According to some embodiments of this aspect, the processing circuitry is also configured to generate at least one correct answer and at least one incorrect answer to the verification question, and the at least one correct answer is based at least on user activity. According to some embodiments of this aspect, the device is in communication with a wireless device. The verification question is presented to the user on the wireless device. According to some embodiments of this aspect, the device is part of remote monitoring center associated with the premises security system.

In another aspect, the disclosure provides for a method for verification of a user. The method is performed on a device in communication with a security base station of a premises security system. The method includes receiving, from the security base station, security system data associated with user activity at a premises monitored by the premises security system. The method also includes generating at least one verification question associated with the user activity and, based on a user response to the verification question, granting or denying access to a user account.

According to some embodiments of this aspect, the verification question is presented after an occurrence of a trigger event. According to some embodiments of this aspect, the generating of the verification question occurs after the occurrence of the trigger event. According to some embodiments of this aspect, the trigger event includes activation of a premises alarm.

According to some embodiments of this aspect, the data corresponding to the user-activity is received from a user device located at the premises. According to some embodiments of this aspect, a confidence value of the at least one verification question is determined. The confidence value is based at least on the user activity.

According to some embodiments of this aspect, display is caused of the verification question if the corresponding confidence value is greater than a predetermined threshold. According to some embodiments of this aspect, at least one correct answer and at least one incorrect answer to the verification question is generated. The at least one correct answer is based at least on user activity.

According to some embodiments of this aspect, the device is in communication with a wireless device, and the verification question is presented to the user on the wireless device. According to some embodiments of this aspect, the device is part of a remote monitoring center associated with the premises security system.

In another aspect, the disclosure provides for a non-transitory computer storage medium storing an executable program that includes instructions configured to cause processing circuitry that is in communication with a security base station of a premises security system to perform a method. The method includes receiving, from the security base station, security system data associated with user activity at a premises monitored by the premises security system. The method also includes generating at least one verification question associated with the user activity, and, based on a user response to the at least one verification, granting or denying access to a user account.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
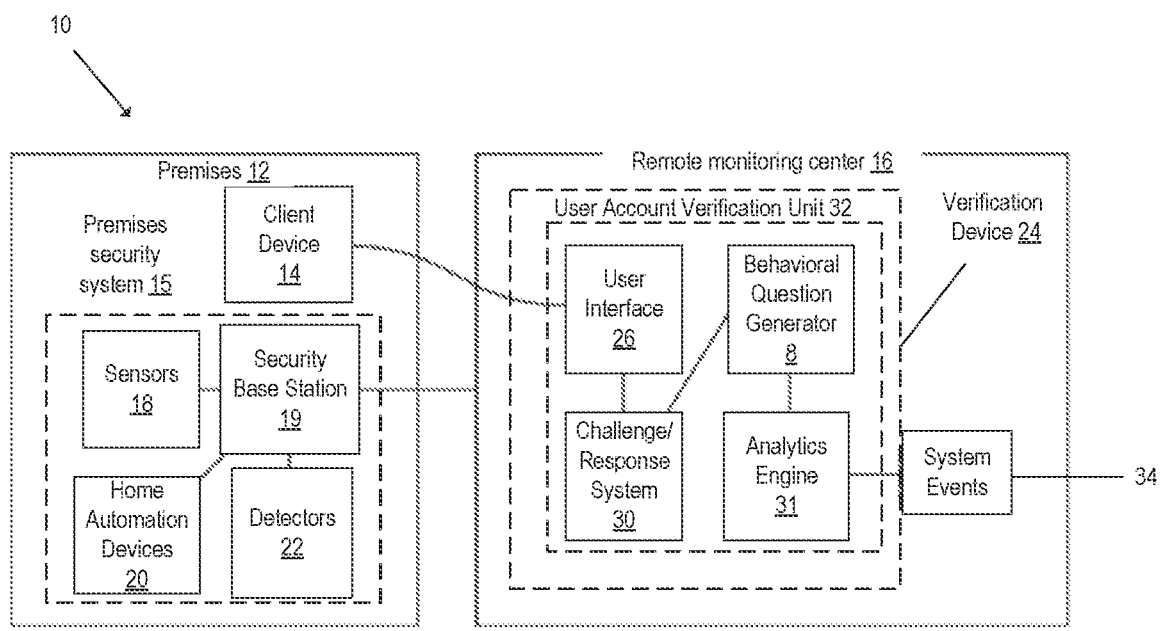
FIG. 1 is a schematic diagram of a system according to the present invention.

Approaches have been attempted to help address the issue with customers forgetting their verbal password or PIC. For example, the alarm monitoring agent may provide hints to help the customer remember their verbal password. However, this leads to a decrease in security if the hints provide too much information that may be publicly available such as on the customer's social media account or in public government records. For example, some hints may include the year the customer was married, or the birthdate of a customer's child, but such information may be readily available to via public channels. Other attempts to address this problem involve customer education campaigns to encourage customers to memorize their verbal password so that they can provide it in the event of a false alarm or alarm event. Although these campaigns may offer some improvement, most customers still do not recall their verbal passwords during an alarm event at the premises.

One or more embodiments described herein solve at least one issues with existing systems/processes discussed above. Before describing in detail exemplary embodiments, it is noted that the embodiments reside primarily in combinations of apparatus components and processing steps related to verification of a user, and in particular generating verification questions corresponding to user activity at a premises (e.g., premises security system based activity). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to drawing figures in which like reference designators refer to like elements, there is shown in FIG. 1 an example system for user account verification in accordance with principals of the invention and designated generally as "10." System 10 may be associated with premises 12 and may include at least one premises security system 15 and remote monitoring center 16. The premises security system 15 may include one or more of at least one sensor 18 (collectively referred to as sensor 18), at least home automation device 20 (collectively referred to as home automation device 20), and at least one detector 22 (collectively referred to as detector 22). For example, the types of sensors 18 may include various safety related sensors such as motion sensors, fire sensors, carbon monoxide sensors, flooding sensors and contact sensors, among other sensor types that are known in the art. The home automation devices 20 may include, for example, one or more lifestyle related devices configured to adjust at least one premises setting such as lighting, temperature, energy usage, door lock and power settings, among other settings associated with the premises or devices on the premises. Those of ordinary skill in the art will also appreciate that various additional sensors and home automation devices 20 may relate to life safety or lifestyle depending on both what the sensors and home automation devices 20 do and how these sensors and home automation devices 20 are used by system 10.

The premises security system 15 may additionally comprise a security base station 19 in communication with one or more of the sensor 18, detector 22, and home automation device 20. The security base station 19 is configured to perform one or more functions described herein such as with respect to, for example, providing for a user to interact with the premises security system 15, including arming or arming security functions.

Premises security system 15 includes at least one client device 14 (collectively referred to as client device 14) may be located on the premises, or may be located remotely. Examples of client devices 14 include but are not limited to devices that allow a user to interact with the various components described herein and can be wired or wireless devices such as cellular telephones, tablets, personal computers, and remote controls.

The premises security system 15 is in communication with a verification device 24 (e.g., user account verification device) located at a remote monitoring center 16. The verification device 24 may comprise one or more of a user interface 26, behavioral question generator 28, challenge/response system 30, and analytics engine 31. The user interface 26 is configured to perform one or more functions described herein such as with respect to, for example, allowing an operator or user to interact with the verification device 24. The challenge/response system 30 is configured to perform one or more functions described herein such as with respect to, for example, presenting generated questions to the user or operator. The behavior question generator 28 is configured to perform one or more functions described herein such as with respect to, for example, generating verification questions as described herein. The analytics engine 31 is configured to perform one or more functions described herein such as with respect to, for example, analyzing user data to generate verification questions. The verification device 24 may also be in communication with a system events database 34. The systems events database 34 is configured to perform one or more functions described herein such as with respect to, for example, storing events pertaining to user activity that can be used in generation of verification questions as described herein.

Communication between the various elements in FIG. 1 and described herein may be achieved by way of one or more networks via one or more communication links. In particular, the communications links may be broadband communication links such as a wired cable modem or Ethernet communication link, and digital cellular communication link, e.g., long term evolution (LTE) and/or New Radio (NR) based link, among other broadband communication links known in the art. Broadband as used herein may refer to a communication link other than a plain old telephone service (POTS) line. Ethernet communication link may be an IEEE 802.3 or 802.11 based communication link. The network may be a wide area network, local area network, wireless local network and metropolitan area network, among other networks known in the art. The network provides communications between one or more of elements in system 10, remote monitoring center 16 and system events database(s) 34.

An example implementation, in accordance with an embodiment, of the verification device 24, client device 14, and security base station 19 discussed in the preceding paragraphs will now be described with reference to FIG. 2.

The system 10 includes a verification device 24 provided in a system 10 and including hardware 36 enabling it to perform one or more functions described herein. The hardware 36 may include a communication interface 37 for communicating with one or more nodes/devices in system 10 such as with the client device 14 or security base station 19.

In the embodiment shown, the hardware 36 of the verification device 24 further includes processing circuitry 38. The processing circuitry 38 may include a processor 40 and a memory 42 (e.g., computer readable medium, non-transitory computer readable medium, etc.). In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the verification device 24 further has software 44 stored internally in, for example, memory 42, or stored in external memory (e.g., database, storage array, network storage device, etc.) accessible by the verification device 24 via an external connection. The processing circuitry 38 may be configured to control any of the methods and/or processes described herein and/or to cause such methods, and/or processes to be performed, e.g., by the verification device 24. Processor 40 corresponds to one or more processors 40 for performing verification device 24 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to the verification device 24. For example, processing circuitry 38 of the verification device 24 may include a user account verification unit 32, which is configured to perform one or more functions described herein such as with respect to verification of a user account.

The system 10 includes a client device 14 provided in a system 10 and including hardware 48 enabling it to perform one or more functions described herein. The hardware 48 may include a communication interface 50 for communicating with one or more nodes/devices in system 10 such as with the verification device 24 or security base station 19.

In the embodiment shown, the hardware 48 of the client device 14 further includes processing circuitry 52. The processing circuitry 52 may include a processor 54 and a memory 56 (e.g., computer readable medium, non-transitory computer readable medium, etc.). In particular, in addition to or instead of a processor, such as a central processing unit, and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 54 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the client device 14 further has software 58 stored internally in, for example, memory 56, or stored in external memory (e.g., database, storage array, network storage device, etc.) accessible by the client device 14 via an external connection. The processing circuitry 52 may be configured to control any of the methods and/or processes described herein and/or to cause such methods, and/or processes to be performed, e.g., by the client device 14. Processor 54 corresponds to one or more processors 54 for performing client device 14 functions described herein. The memory 56 is configured to store data, programmatic software code and/or other information described herein. In some embodiments, the software 58 may include instructions that, when executed by the processor 54 and/or processing circuitry 52, causes the processor 54 and/or processing circuitry 52 to perform one or more functions described herein with respect to the client device 14.

The system 10 includes a security base station 19 provided in a system 10 and including hardware 62 enabling it to perform one or more functions described herein. The hardware 62 may include a communication interface 64 for communicating with one or more nodes/devices in system 10 such as with the verification device 24.

In the embodiment shown, the hardware 62 of the security base station 19 further includes processing circuitry 66. The processing circuitry 66 may include a processor 68 and a memory 70 (e.g., computer readable medium, non-transitory computer readable medium, etc.). In particular, in addition to or instead of a processor, such as a central processing unit, and memory, the processing circuitry 66 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 68 may be configured to access (e.g., write to and/or read from) the memory 70, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the security base station 19 further has software 72 stored internally in, for example, memory 70, or stored in external memory (e.g., database, storage array, network storage device, etc.) accessible by the security base station 19 via an external connection. The processing circuitry 66 may be configured to control any of the methods and/or processes described herein and/or to cause such methods, and/or processes to be performed, e.g., by the security base station 19. Processor 68 corresponds to one or more processors 68 for performing security base station 19 functions described herein. The memory 70 is configured to store data, programmatic software code and/or other information described herein. In some embodiments, the software 72 may include instructions that, when executed by the processor 68 and/or processing circuitry 66, causes the processor 68 and/or processing circuitry 66 to perform one or more functions described herein with respect to the security base station 19.

Figure 2:
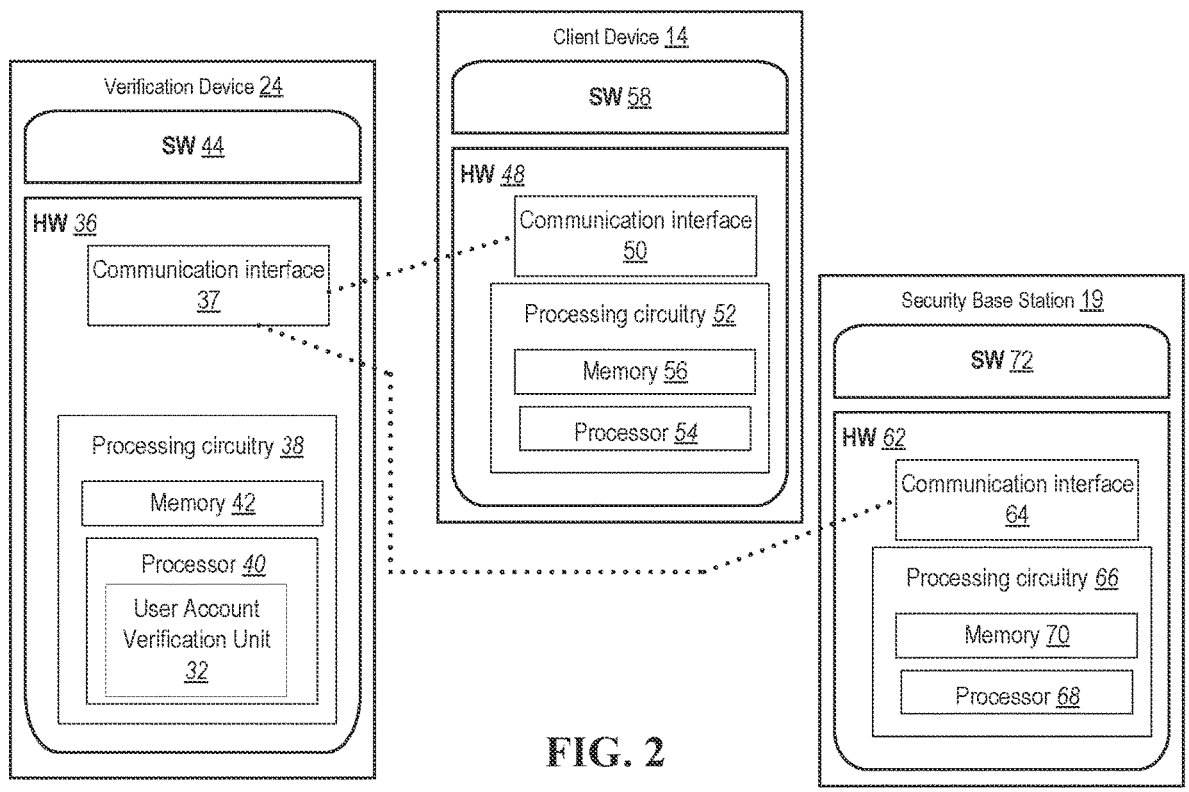
FIG. 2 is a block diagram of several elements of the system according to some embodiments disclosed herein.

Although FIGS. 1 and 2 show the user account verification unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
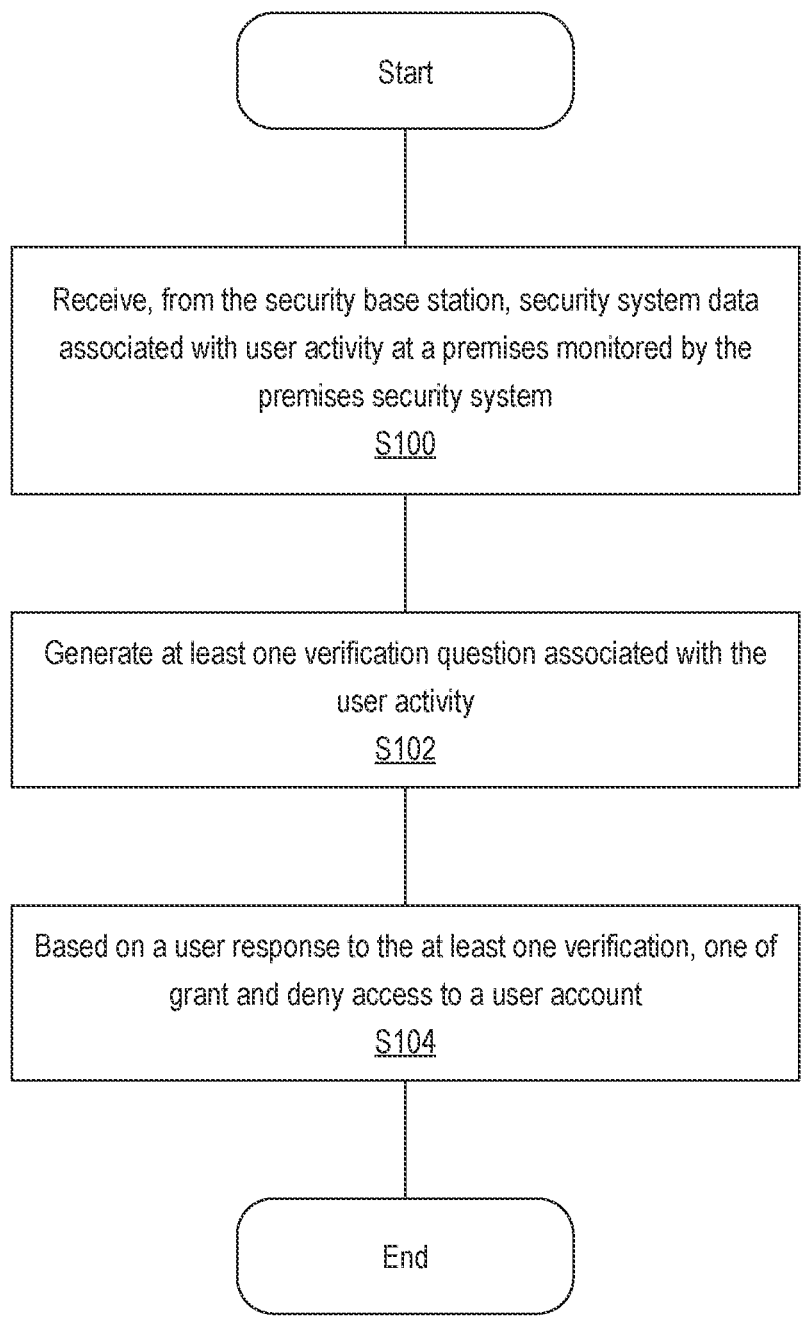
FIG. 3 is a flowchart of an example process implemented by a user account verification device according to at least one embodiment disclosed herein.

FIG. 3 is a flowchart of an example process in a verification device 24 according to one or more embodiments of the present disclosure. One or more blocks described herein may be performed by one or more elements of the verification device 24 such as by one or more of processing circuitry 38 (including the user account verification unit 32), processor 40, and/or communication interface 37. The verification device 24 is configured to receive, from the security base station 19, security system data associated with user activity at a premises 12 monitored by the premises security system 15 (Block S100). The verification device 24 is configured to generate at least one verification question associated with the user activity (Block S102). Based on a user response to the at least one verification, the verification device 24 is configured to one of grant and deny access to a user account (Block S104). For example, the remote monitoring center 16/verification device 24 may grant access to the user's account after verification such as to allow the user to cancel a triggered alarm/trigger event.

In at least one embodiment, the processing circuitry 38 is also configured to present the verification question after an occurrence of a trigger event. In at least one embodiment, the generating of the verification question occurs after the occurrence of the trigger event. In at least one embodiment, the trigger event includes activation of a premises alarm.

In at least one embodiment, the processing circuitry 38 is also configured to receive the data corresponding to the user-activity from a user device located at the premises. In at least one embodiment, the processing circuitry is also configured to determine a confidence value of the at least one verification question. The confidence value is based at least on the user activity.

In at least one embodiment, the processing circuitry 38 is also configured to cause display of the verification question if the corresponding confidence value is greater than a predetermined threshold. In at least one embodiment, the processing circuitry 38 is further configured to generate at least one correct answer and at least one incorrect answer to the verification question. The at least one correct answer is based at least on user activity.

In at least one embodiment, the verification device 24 is in communication with a wireless device 22, and the verification question is presented to the user on the wireless device. In at least one embodiment, the verification device 24 is part of a remote monitoring center 16 associated with the premises security system 15.

Figure 4:
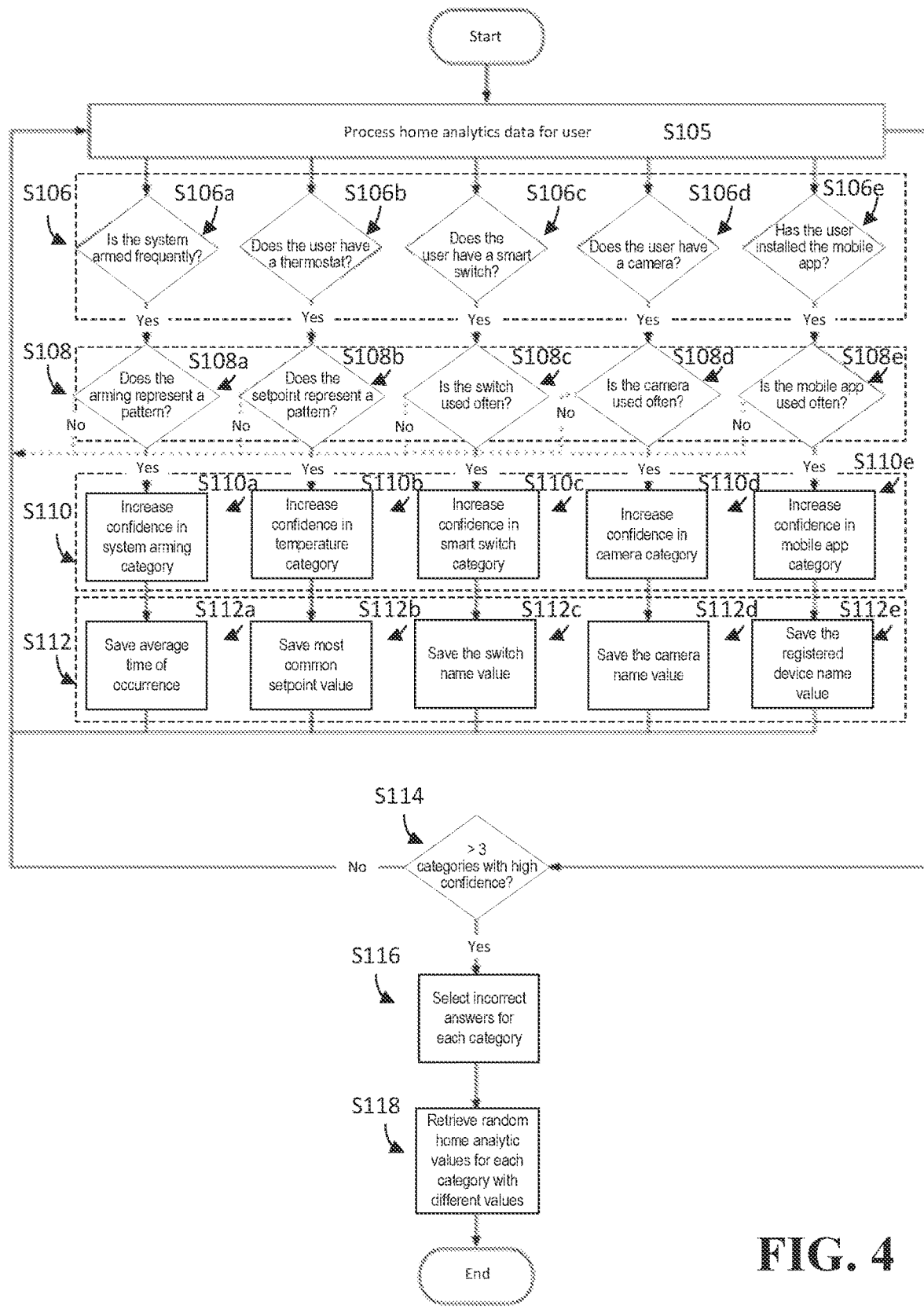
FIG. 4 is a flowchart of an example process for generating verification questions.

FIG. 4 is a flowchart of an example process for generation of a verification question as may be implemented as described herein, including by the verification device 24. Verification device 24 processes home analytics data for users (Block S105). For example, the home analytics data and/or security system data is processed using known methods in the art such as to, for example, categorize the data and determine one or more values/parameters associated with the data. In one or more embodiments, at least one of security system data and home analytics data is associated with user activity at a premises monitored by the premises security system 15.

Verification device 24 determines verification topics (Block S106). Some examples potential verification topics are illustrated in Block S106*a-e*, and include:
  Is the security system armed frequently? (Block S106*a*)
  Does the user have a smart thermostat? (Block S106*b*)
  Does the user have a smart switch? (Block S106*c*)
  Does the user have a camera? (Block S106*d*)
  Has the user installed the mobile application? (Block S106*e*)
However, one or more other verification topics associated with premises security system 15 may also be used by verification device 24.

Verification device 24 is configured to determine whether there is sufficient date available for one or more considerations/determinations (Block S108). If any of the questions in S106*a-e* can be answered in the affirmative, then existence of whether sufficient data is available is determined. For example, in the case of arming of the premises security system 15, a determination of whether the arming represents a pattern is made (Block S108*a*). In the case of a thermostat (e.g., sensor 18, home automation device 20), the determination of whether the setpoint, i.e. temperature, represents a pattern (Block S108*b*). In the case of components such as a smart switch, camera, or mobile application, a determination of whether the respective component is used often (Blocks 108*c-e*). If any of these determinations can are in the affirmative, the confidence in the respective category, i.e. security system arming, temperature, smart switch, camera, and mobile application, is increased (Blocks S110, S110*a-e*). Relevant information (e.g., relevant to on) is then saved (Block S112), such as average time of occurrence of security system arming, most common temperature setpoint value, smart switch name value, camera name value, registered user device name value is saved (Blocks S112*a-e*).

If there is a sufficient number of categories with increased confidence, for example at least three (Block S114), then incorrect answers for each category are generated (Block S116). Random home analytic values for each category with different values and increased confidence are then retrieved (Block S118).

In at least one embodiment, during an alarm, or when user identification needs to be performed so that a user may perform actions requiring elevated security, the user will be prompted such as by verification device 24 and/or client device 14 to answer questions related to their home activities as an alternative method for identification.

In at least one embodiment, the process begins when the user receives a text message or push message to the registered mobile devices (e.g., client device 14) for the homeowner and people on the emergency contact list. The text message presents a user interface to confirm or cancel the alarm and prompt the user for their verbal password or answer questions to prove their identity. That is, for example, account verification may need to be performed for the user in order to allow the remote monitoring center 16 to cancel the alarm at the remote monitoring center 16 (e.g., cancel first responders, etc.) and/or to cancel the alarm at the premises security system 15 such as by transmitting a signal/message to security base station 19 to cancel the alarm. The questions are asked as a multiple choice, typically with one answer being the correct answer for the customer, along with three incorrect but reasonable answers. The system chooses unique questions that the homeowner and home occupants have a high likelihood of answering correctly. If the user can answer a pre-defined number of questions correctly, for example three, then the user has successfully provided identification, and can take elevated security actions such as cancelling an alarm.

Examples of Questions Include:
Which of these on/off switches do you use in your home?
  a) Family room lamp
  b) Basement lights
  c) Living room
  d) Bedroom sconces
Around what time was your security alarm system disarmed this morning?
  a) 8:00 am
  b) 6:30 am
  c) 9:00 am
  d) 10:00 am
Which of the names below represent your home?
  a) Casa de Smith
  b) Smith family residence
  c) Cabin
  d) $2^{nd}$ home Referring back to FIG. 1, verification device 24 includes the following plurality of subsystems: user interface 26, challenge/response system 30, behavioral question generator 28, analytics engine 31 that may be implemented by one or more of processing circuitry 38, processor 40, user account verification unit 32, etc. Verification device 24 further includes a system events database 34 populated by the premises security system 15 in the premises 12. The security base station 19 performs one or more functions described herein such as with respect to, for example, collecting events through its normal operation and publishing one or more (or all) events to the remote monitoring center 16. Functions of the remote monitoring center 16 may be performed by an interactive security cloud platform in a cloud computing network. Events published to the remote monitoring center 16, are persisted in a system events database 34.

These events are timestamped occurrences of user generated actions-such as arming the security system—and system generated actions—such as the thermostat reporting a temperature change in the premises. A behavioral question generator 28 performs one or more functions described herein such as with respect to, for example, analyzing the system event data for the premises, through the analytics engine, to build a confidence score for each of a predetermined list of user behavior questions.

The following list is an example of the types of predefined home analytics questions that may be presented to a user:
  What time was your security alarm system disarmed?
  What time was your security alarm system armed?
  Which of these sensors represents a perimeter door at your home?
  Which of these system names represents your home?
  Which of these on/off switches do you have in your home?
  What month and year did you most recently sign up for ADT?
  What is the average amount of your ADT monthly bill?
  Which of these cameras do you have in your home?
  What temperature do you most often set your thermostat?
  Which of these registered devices do you use with your security alarm system?
  Which of these automations do you use in your home?
  What month and year did you last put your system in Vacation mode?

Which of these automated schedules do you use?

The challenge/response system 30 performs one or more functions described herein such as with respect to, for example, selecting questions, from the list of high confidence questions, and choosing reasonable but inaccurate answers, together with the correct answer, for each question. Inaccurate answers are selected at random from a list of correct answers for other customers, as long as the values are sufficiently different from the correct answer. Answers too close to the correct answer are disregarded and not used in formulating the challenge response questions. For example, if the user for the premises uses an average temperature setpoint value of 68, then 67 and 69 are not used as potential answers in that question. The challenge/response system is also responsible for identifying how many of the user's selected answers are correct.

In one embodiment, the user may skip a question and, if the user answers three questions correctly, the user is positively identified. Alternatively, a correct answer may be the option "none of the above."

The analytics engine 31 is configured to perform one or more functions described herein such as with respect to, for example, analyze user data for use in generation of verification questions and determine the confidence value of generated verification question topics.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A device for verification of a user, the device being configured to communicate with a security base station of a premises security system, the device comprising:
   processing circuitry configured to:
      receive, from the security base station, security system data associated with user activity at a premises monitored by the premises security system;
      determine that the security system data comprises data relating to at least one verification topic associated with the premises security system, the at least one verification topic relating to at least one operation of the premises security system;
      detect, in the security system data, one or more of a pattern in or a frequency of an occurrence of the at least one operation of the premises security system;
      assign a confidence value to each of the at least one verification topic based on the detected one or more of the pattern or the frequency of the occurrence of the at least one operation of the premises security system;
      select, based on the confidence value exceeding a threshold, at least one verification question to present to a user based on at least a portion of the security system data that relates to the user activity and the at least one verification topic; and
      based on a response from the user to the at least one verification question, grant or deny the user access to a user account.

2. The device of claim 1, wherein the processing circuitry is further configured to present the at least one verification question after an occurrence of a trigger event.

3. The device of claim 1, wherein the generating of the at least one verification question occurs after an occurrence of a trigger event.

4. The device of claim 2, wherein the trigger event comprises activation of a premises alarm.

5. The device of claim 1, wherein the processing circuitry is further configured to receive the data corresponding to the user-activity from a user device located at the premises.

6. The device of claim 1, wherein the processing circuitry is further configured to generate at least one correct answer and at least one incorrect answer to the at least one verification question, and the at least one correct answer being based at least on user activity.

7. The device of claim 1, wherein the device is in communication with wireless device, and the at least one verification question is configured to be presented to the user on the wireless device.

8. The device of claim 1, wherein the device is part of a remote monitoring center associated with the premises security system.

9. A method for verification of a user, the method being performed on a device configured to communicate with a security base station of a premises security system, the method comprising:
   receiving, from the security base station, security system data associated with user activity at a premises monitored by the premises security system;
   determining that the security system data comprises data relating to at least one verification topic associated with the premises security system, the verification topic relating to at least one operation of the premises security system;

detecting, in the security system data, one or more of a pattern in or a frequency of an occurrence of the at least one operation of the premises security system;

assigning a confidence value to each of the at least one verification topic based on the detected one or more of the pattern or the frequency of the occurrence of the at least one operation of the premises security system;

selecting, based on the confidence value exceeding a threshold, at least one verification question to present to a user based on at least a portion of the security system data that relates to the user activity and the at least one verification topic; and based on a response from the user to the at least one verification question, granting or denying the user access to a user account.

10. The method of claim 9, further comprising presenting the at least one verification question after an occurrence of a trigger event.

11. The method of claim 9, wherein the generating of the at least one verification question occurs after an occurrence of a trigger event.

12. The method of claim 10, wherein the trigger event comprises activation of a premises alarm.

13. The method of claim 9, further comprising receiving the data corresponding to the user-activity from a user device located at the premises.

14. The method of claim 9, further comprising generating at least one correct answer and at least one incorrect answer to the at least one verification question, and the at least one correct answer being based at least on user activity.

15. The method of claim 9, wherein the device is in communication with a wireless device, and the at least one verification question is presented to the user on the wireless device.

16. The method of claim 9, wherein the device is part of a remote monitoring center associated with the premises security system.

17. A non-transitory computer storage medium storing an executable program comprising instructions configured to cause processing circuitry that is configured to communicate with a security base station of a premises security system to perform a method, the method comprising:

receiving, from the security base station, security system data associated with user activity at a premises monitored by the premises security system;

determining that the security system data comprises data relating to at least one verification topic associated with the premises security system, the verification topic relating to at least one operation of the premises security system;

detecting, in the security system data, one or more of a pattern in or a frequency of an occurrence of the at least one operation of the premises security system;

assigning a confidence value to each of the at least one verification topic based on the detected one or more of the pattern or the frequency of the occurrence of the at least one operation of the premises security system;

select, based on the confidence value exceeding a threshold, at least one verification question to present to a user based on at least a portion of the security system data that relates to the user activity and the at least one verification topic; and based on a response from the user to the at least one verification question, granting or denying the user access to a user account.

\* \* \* \* \*